United States Patent Office
3,657,259
Patented Apr. 18, 1972

3,657,259
PROCESS FOR THE PRODUCTION OF PYRIDINE CARBOXYLIC ACIDS
August Stocker, Othmar Marti, Theodul Pfammatter, and Gerhart Schreiner, Visp, Switzerland, assignors to Lonza Ltd., Gampel, Valais, Direction: Basel, Switzerland
No Drawing. Filed Oct. 28, 1969, Ser. No. 871,951
Claims priority, application Switzerland, Nov. 8, 1968, 16,688/68; Feb. 24, 1969, 2,732/69; June 6, 1969, 8,622/69; Aug. 1, 1969, 11,759/69; Sept. 19, 1969, 14,168/69
Int. Cl. C07d 31/36
U.S. Cl. 260—295 R       17 Claims

ABSTRACT OF THE DISCLOSURE

Nicotinic acid and other carboxylic acids having a pyridine nucleus may be prepared by the oxidation of alkyl pyridine and compounds in the presence of 25–600% excess nitric acid at temperatures of 180–370° C. with pressures of 20–500 atm. The nitric acid concentration of the reaction mixture is adjusted to 10–28% to precipitate as crystalline hydronitrate and separated from the mixture. The pH of an aqueous solution of the pyridine carboxylic acid hydronitrate is adjusted with the basic starting material to the isoelectric point of the specific pyridine carboxylic acid to precipitate the same. The crystalline precipitation is separated and the mother liquors are combined and recycled as the starting material after adjustment of the concentrations therein.

BACKGROUND OF THE INVENTION

(1) Field of the invention

The invention relates to a process for the production of carboxylic acids containing a pyridine nucleus through oxidation of the pyridine compound with nitric acid at elevated temperatures and elevated pressures.

Prior art

Pyridine carboxylic acids have been produced by the oxidation of alkyl pyridines with nitric acid. In practicing this process, one generally proceeds in such a manner that the solution, containing the pyridine carboxylic acid, emerges from the reactor with a pH value which corresponds precisely to the isoelectric point of the pyridine carboxylic acid. Then the pyridine carboxylic acid is crystallized out and separated. However, the disadvantage of this method of operation lies in the fact, that the pyridine carboxylic acid product is impure and the mother liquor still contains large quantities of pyridine bases and pyridine carboxylic acids. Working up of this mother liquor is very expensive and has been found commercially unsatisfactory. For example, nicotinic acid is produced by this prior art process through oxidation of 2-methyl-5-ethyl pyridine. The starting mixture usually contains 5–6 moles of the pyridine compound that is converted at 190–200° C. and 35 atmospheres to isocinchomeronic acid which is decarboxylized to nicotinic acid at 220° C. These reactions require about 40–45 minutes. The solution leaving the reactor has a pH value of 3.4 and nicotinic acid is crystallized from this solution as a bright yellow product. The starting material reacted is approximately 80% and the yield is about 80% of the reacted starting material. The resulting mother liquor must be concentrated in order to further recover nicotinic acid therefrom and the unreacted starting material is isolated from the remaining filtrate.

DESCRIPTION OF THE INVENTION

The present invention eliminates the disadvantages of the prior art processes.

According to the present invention, 25 to 600% excess acid is used above the quantity required in theory for oxidation of the pyridines and the mixture at temperatures of 180–370° C., preferably 230 to 350° C., with pressures of 20–500 atm., preferably 50 to 300 atm. for a reaction time of 2 seconds to 30 minutes. The resulting reaction mixture is adjusted to have a nitric acid concentration of 10–28% and the pyridine carboxylic acid is crystallized out at a temperature of 0–20° C. as a hydronitrate and separated from the acid mother liquor. The crystallized pyridine carboxylic acid hydronitrate is then dissolved in water, the pH of the solution is adjusted with the basic starting material to the isoelectric point of the pyridine carboxylic acid product and the pyridine carboxylic acid is separated by crystallization. The base containing mother liquor and the reaction mixture mother liquor are combined, fortified to adjust concentrations and recycled as the starting mixture.

The use of an excess of $HNO_3$, which is preferably 30–400% above the quantity theoretically required for the oxidation, promotes the formation of the hydronitrate of the pyridine carboxylic acid.

While the reaction time varies within the boundaries, 8–14 minutes generally provides a favorable balance of a high conversion percentage against decomposition of the pyridine carboxylic acid product within the preferred ranges. One skilled in the art can determine the optimum reaction time without difficulty because the time will be in the range of about 2 seconds to 30 minutes.

The nitric acid concentration of the reaction mixture containing the hydronitrate is adjusted to the point of minium solubility to obtain a maximum separation of the hydronitrate. It is particularly advantageous to precipitate the hydronitrate at 4–12° C. from a reaction mixture having a nitric acid concentration of 12–25% by weight based on reaction solution.

The precipitate of hydronitrate is dissolved in a small amount of water and the pyridine carboxylic acid is formed by the addition of supplemental pyridine compounds. During this addition, pyridine carboxylic acid is precipitated. The quantity of pyridine compound which is added varies with the isoelectric point of the particular pyridine carboxylic acid to be precipitated. To improve the product purity, it is advantageous to briefly heat the precipitated pyridine carboxylic acid to redissolve the acid and then to cool the solution to obtain a second precipitation. The pyridine carboxylic acid thus obtained from the base containing mother liquor is a substantially pure product.

Since the pyridine carboxylic acid was formed by the pyridine compound, the mother liquor obtained after separation of the acid product will contain large quantities of this starting material. This mother liquor is combined with the mother liquor resulting from the separation of the hydronitrate; the concentrations are adjusted by the addition of starting material and nitric acid; and the mother liquor is then recycled.

One advantage of the process of the invention is that many diverse carboxylic acids having a pyridine nucleus can be produced. For example, nicotinic acid, isonicotinic acid, picolinic acid, isocinchomeronic acid, and cinchomeronic acid can be prepared from alkyl pyridines, such as methyl-ethyl pyridine, picoline, collidine, lutidine, ethyl pyridine and dimethyl pyridine. In addition, nicotinic acid, dinicotinic acid carbisocinchomeronic acid, carbodinicotinic acid and 2,3,5,6 pyridinetetracarboxylic acid may be prepared from fused ring compounds having a pyridine core, such as quinoline, derivatives of quinoline such as, quinoldine, lepidine, hydroxyquinoline, and aminoquinoline, isoquinoline, similar derivatives of isoquinoline, acridine and similar derivatives of acridine. The alkyl substituents may contain 1–20 carbon and alkyl groups of 1–4 are preferred.

The use of 30 to 400% excess nitric acid over the theoretical quantity is preferred.

The oxidation by this process results in conversions of 95–99% with a substantially pure product yield of up to 99.8 percent. Because of the product purity, further purification is unnecessary.

Reaction vessels made of titanium are preferred and, if the higher pressures of the disclosed range are used, titanium lined steel pipe is satisfactory.

The temperature at which the oxidation is conducted may be selected to decarboxylate the acid formed. If the oxidation is conducted at temperatures above about 250° C., the corresponding acid is decarboxylated and is not isolated but acids containing fewer groups can be obtained. The following reactions demonstrate several examples of acids which may be prepared directly by oxidation, as well as oxidation-decarboxylation.

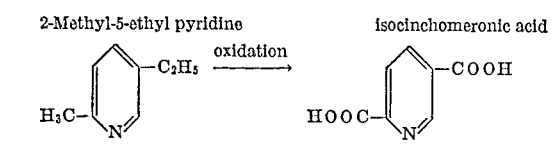

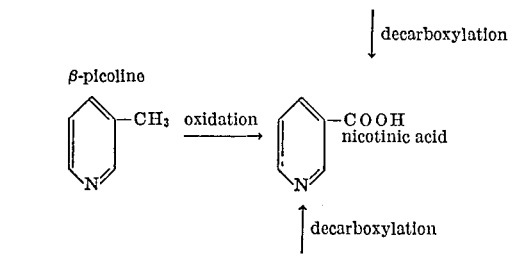

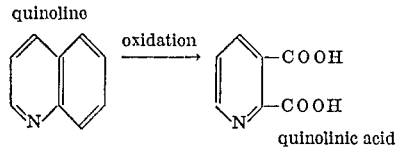

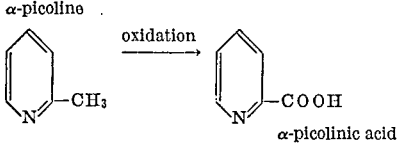

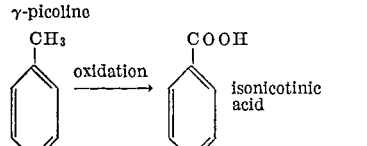

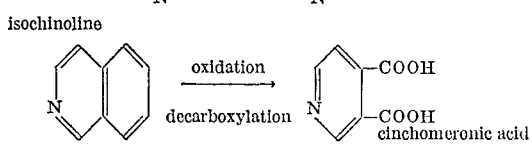

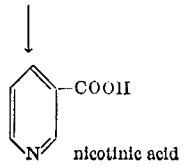

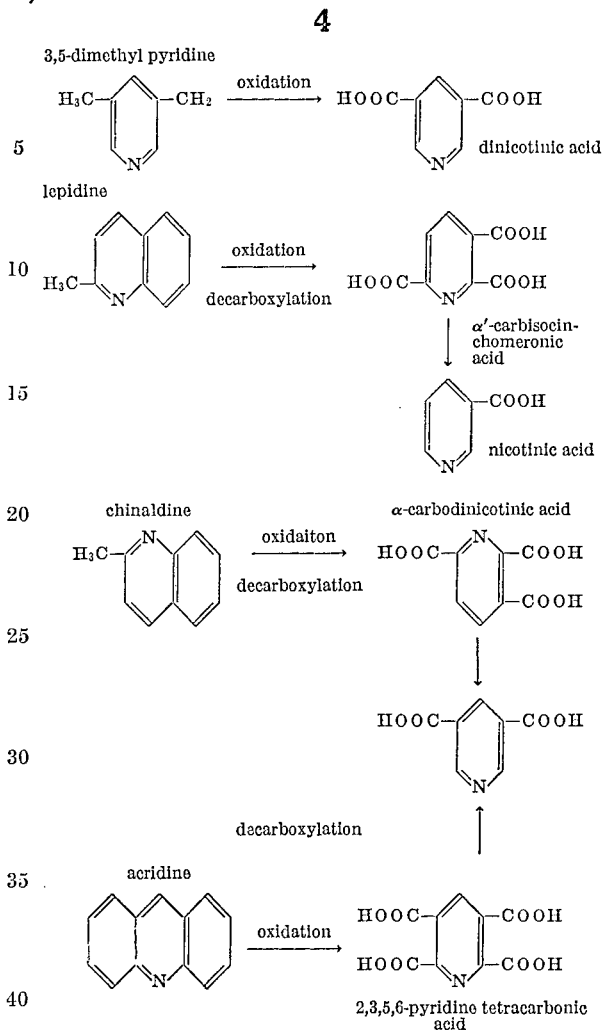

The following examples are presented:

EXAMPLE I 4632 g. of a mixture of 6.3% 2-methyl-5-ethyl pyridine and 28.1% HNO₃ (corresponding to a surplus of about 42% over theoretical) were passed through a 1.48 l. reactor tube made of V2A steel, at a temperature of 239° C. and 55 atm. of pressure. The retention time was 12.72 minutes and the conversion took 35 minutes. The liquid reaction product weighed 3966 g. The remainder, 666 g. (14.35%), was conducted off in a gaseous form. The liquid reaction product was concentrated by boiling until the nitric acid concentration was 15% and then it was cooled to 5° C. 354.2 g. of nicotinic acid hydronitrate with a nicotinic acid content of 66.1% were crystallized out. This product was separated from the acid mother liquor (833 g.) by centrifuging. An additional 30.8 g. of nicotinic acid were contained in the mother liquor with the content of isocinchomeronic acid being below 0.1%.

The nicotinic acid hydronitrate (354.2 g.) was dissolved in 1100 g. water, heated to 60° C., adjusted to a pH value of 3.3 by addition of 2-methyl-5-ethyl pyridine (230 g.) and was heated to 90° C. After cooling, the precipitated nicotinic acid was centrifuged off and dried. The yield was 188 g. of nicotinic acid with a conversion of 95% based on the 2-methyl-5-ethyl pyridine corresponding to an isolated yield of 66.9%. The total yield (isolated nicotinic acid plus nicotinic acid in the mother liquor) amounted to 94.5%. The two mother liquors were combined and still contained 77.8 g. of nicotinic acid and 244.81 g. of 2-methyl-5-ethyl pyridine. These mother liquors were adjusted to the starting concentration by additions of 2-methyl-5-ethyl pyridine and nitric acid.

The solution at the starting concentration, was converted and worked up as described previously. This process produced 250 g. nicotinic acid, corresponding to the isolated yield of 88.9% at a conversion of 95%. The nicotinic acid obtained was pure white and the purity was 99.6%.

EXAMPLE II

The mother liquor of a previous deposit, containing 77.0 g. of nicotinic acid, 236.7 g. of 2-methyl-5-ethyl pyridine and 120 g. of $HNO_3$ (100%), was adjusted to a weight of 4432 g. and a concentration of 4.68% 2-methyl-5-ethyl pyridine and 19.5% $HNO_3$ (corresponding to a surplus of 32%) by the addition of 2-methyl-5-ethyl pyridine and nitric acid. This solution was used as the starting mixture and was conducted through a 1.6 l. titanium reactor tube 1. (length, about 16 m.) at 234° C. and 52 atm. with a retention time of 8.7 minutes. The reacted mixture was treated according to the procedure of Example 1. The conversion was 97.3% and 166 g. of nicotinic acid resulted which corresponded to an isolated yield of 82.0%. The mother liquors were again combined and returned to the process.

EXAMPLE III 4500 g. of a mixture of 5.18% β-picoline and 35% nitric acid (corresponding to a surplus of 400% beyond the theoretical quantity) were raised through a 1.6 l. titanium reactor tube at a temperature of 260° C. and 50 atm., with a retention time of 3.75 minutes.

4115 g. of a liquid reactor product resulted. The remainder, 385 g. (8.6%), was conducted off in the form of a gas. The liquid reaction product was adjusted to a nitric acid concentration of 25% and was cooled to 5° C. This precipitated 213.4 g. of nicotinic acid hydronitrate with a nicotinic acid content of 66.3% and was separated from the acid mother liquor (950 g.) by centrifuging. There were additional 47.5 g. of nicotinic acid contained in the mother liquor.

The nicotinic acid hydronitrate (213.4 g.) was dissolved in 710 g. of water, heated to 60° C., adjusted to a pH value of 3.4 with β-picoline (107 g.) and heated to 95° C.

After cooling, the nicotinic acid was centrifuged off and dried. 113.0 g. of nicotinic acid was obtained at a conversion of 68.6% based on the β-picoline used. This corresponds to an isolated yield of 60.4% and a total yield (isolated nicotinic acid plus nicotinic acid in the mother liquor) of 89.0%.

The acid and the base containing mother liquors were combined and contained 47.5 of nicotinic acid and 180 g. of β-picoline. These combined mother liquors were adjusted to the starting concentration and volume with β-picoline and $HNO_3$. This solution was recycled through the reactor tube to produce 151.8 g. of nicotinic acid, corresponding to an isolated yield of 80.5%, based on a conversion of 68.6%. The nicotinic acid obtained was pure white having a purity of 99.7%.

EXAMPLE IV 4500 g. of a mixture of 8.0% quinoline with 32% nitric acid (corresponding to 50% excess of the theoretical quantity) with a residence time of 2.0 minutes were passed through a 1.6 l. titanium reactor pipe (length 16 m.) at a temperature of 260° C. and 55 atm. 4010 g. of a liquid raw product resulted. The remainder of 4090 g. was released in the form of a gas. The liquid reaction product was adjusted to a nitric acid concentration of 25% and cooled to 0° C. to precipitate 380.0 g. of nicotinic acid hydronitrate with a nicotinic acid content of 66.3%. This raw product was separated from the acid mother liquor (1020 g.) by centrifuging and 46.0 gm. of nicotinic acid remained in the mother liquor.

The nicotinic acid hydronitrate (380 g.) was dissolved in 1350 g. of water and adjusted to a pH of 3.4 by quinoline at 95° C. After cooling 7° C. the nicotinic acid precipitated and was centrifugally separated and dried. 210 g. of nicotinic acid resulted with a conversion of 96% based on the quinoline corresponding an isolated yield of 63.9%.

The total yield, isolated nicotinic acid in the mother liquor, was 92.0%.

The acid and the mother liquors were combined and adjusted by quinoline and nitric acid to the starting concentration and quantity. This solution was recycled and processed under the conditions described above to produce 283.0 g. of nicotinic acid, corresponding to an isolated yield of 86% with quinoline conversion of 96%. The nicotinic acid was pure white and had a purity of 99.8%.

EXAMPLE V 4720 g. (4000 ml.) of a mixture of 6.4% of 2-methyl-5-ethyl pyridine and 33% of $HNO_3$ were passed through a 30.5 ml. titanium reaction tube during a period of 12 minutes at 330° C., and 280 atm. The liquid reaction product weighed 4090 g. The remainder, 630 g. (13.3%), was removed as gas.

The reaction product was reduced by evaporation to a nitric acid concentration of 25% and cooled to 0° C. This precipitated as crystals, 394.7 g. of nicotinic acid hydronitrate with a nicotinic acid content of 66.3%. This product was separated by centrifuging from the acid mother liquor (870 g.). The mother liquor contained an additional 30 g. of nicotinic acid. The content of isocinchomeronic acid in the mother liquor was 0.25%.

The nicotinic acid hydronitrate (394.7 g.) was dissolved in 1200 g. of water, heated to 95° C. and adjusted to a pH value of 3.3 with 287.0 g. of 2-methyl-5-ethyl pyridine. After cooling, the liberated crystallized nicotinic acid was centrifuged off and dried. 204 g. of nicotinic acid was obtained at a conversion of 95%, based on the 2-methyl-5-ethyl pyridine. This corresponds to an isolated yield of 70.0% with a total yield (isolated nicotinic acid+nicotinic acid in the mother liquor) of 95.0%. The Two combined mother liquors still contained 73 g. of nicotinic acid and 302.0 g. of 2-methyl-5-ethyl pyridine.

These combined mother liquors were again adjusted to the starting concentrations and quantity by nitric acid and recycled through the process. There resulted 248.0 g. of nicotinic acid, corresponding to an isolated yield of 84.0%, at a conversion of 95.0%. The nicotinic acid obtained was pure white and had a purity of 99.6%.

We claim:

1. A process for the production of a pyridine carboxylic acid from a lower alkyl pyridine which consists of oxidizing a lower alkyl pyridine with nitric acid, said nitric acid being present in an amount from 25 to about 400 percent excess of the theoretical quantity, at about 180° to about 370° C. under about 20 to 500 atm. of pressure for at least 2 seconds, precipitating the oxidation product as a hydronitrate, forming an aqueous solution by dissolving the hydronitrate in water and recovering the pyridine carboxylic acid from a lower alkyl pyridine from the aqueous solution.

2. A process according to claim 1 wherein said lower alkyl pyridine has more than one alkyl group.

3. A process according to claim 2 wherein said alkyl groups have 1 to 4 carbons.

4. A process according to claim 1 wherein said lower alkyl pyridine is selected from the class consisting of methyl-ethyl pyridine, picoline, collidine, lutidine and ethyl pyridine, and dimethyl pyridine.

5. A process according to claim 4 wherein the excess nitric acid is present in an amount from about 30 to about 400 percent more than the theoretical amount required.

6. A process according to claim 5 wherein the temperature of oxidation is from 230° to 350° C., and the pressure is from 50 to 300 atm.

7. A process according to claim 4 wherein said pyridine carboxylic acid is separated by adjusting the pH of the aqueous solution to the isoelectric point of said pyridine carboxylic acid with said lower alkyl pyridine to effect precipitation.

8. A process according to claim 2 wherein the excess nitric acid is present in an amount from about 30 to about 400 percent more than the theoretical amount required.

9. A process according to claim 8 wherein the hydronitrate is precipitated at about 0° to 20° C. by adjusting the nitric acid concentration of the reacted mixture to about 10 to 28 percent.

10. A process according to claim 2 wherein the temperature of oxidation is from 230° to 350° C., and the pressure is from 50 to 300 atm.

11. A process according to claim 1 wherein said pyridine carboxylc acid is separated by adjusting the pH of the aqueous solution to the isoelectric point of said pyridine carboxylic acid with said lower alkyl pyridine to effect the precipitation.

12. A process according to claim 1 wherein the hydronitrate is precipitated at about 0° to 20° C. by adjusting the nitric acid concentration of the reacted mixture substantially to the point of minimum solubility for the specific hydronitrate.

13. A process according to claim 12 wherein the temperature during precipitation is 4° to 12° C. and the nitric acid concentration of the reacted mixture is adjusted to about 12 to about 25 percent.

14. A process according to claim 13 wherein said pyridine carboxylic acid is separated by adjusting the pH of the aqueous solution to the isoelectric point of said pyridine carboxylic acid with said lower alkyl pyridine to effect precipitation.

15. A process according to claim 14 wherein the aqueous solution is heated prior to the separation step.

16. A process for the production of a pyridine carboxylic acid from a lower alkyl pyridine which consists of: oxidizing a lower alkyl pyridine with nitric acid, said nitric acid being present in an amount from 25 to about 400 percent in excess of the theoretical quantity, at about 180° to about 370° C. under about 20 to 500 atmospheres of pressure for at least 2 seconds; precipitating the oxidation product as a hydronitrate; forming an aqueous solution by dissolving the hydronitrate in water; recovering the pyridine carboxylic acid from a lower alkyl pyridine from the aqueous solution; combining the mother liquors resulting from the precipitation step and the recovery step; adjusting the combined mother liquors to substantially the same concentrations as the oxidation mixture; and recycling the adjusted combined mother liquors through the process as starting material.

17. A process according to claim 16 wherein said pyridine carboxylic acid from a lower alkyl pyridine is separated by adjusting the pH of the aqueous solution to the isoelectric point of said pyridine carboxylic acid from a lower alkyl pyridine with said lower alkyl pyridine to effect precipitation.

References Cited
UNITED STATES PATENTS 2,723,271  11/1955  Martin _____ 260—295 R
3,165,548  1/1965  Bartholome et al. __ 260—295 R ALAN L. ROTMAN, Primary Examiner U.S. Cl. X.R.

260—295.5 R